March 22, 1966 J. H. DAVIS 3,241,405
COUNTERSINK TOOL

Original Filed May 31, 1962 2 Sheets-Sheet 1

INVENTOR.
John H. Davis
BY Wm. T. Wofford
Attorney

March 22, 1966  J. H. DAVIS  3,241,405
COUNTERSINK TOOL
Original Filed May 31, 1962  2 Sheets-Sheet 2

INVENTOR.
John H. Davis
BY Wm. T. Wofford
Attorney

United States Patent Office 3,241,405
Patented Mar. 22, 1966

3,241,405
COUNTERSINK TOOL
John H. Davis, Rte. 8, Box 693, Fort Worth, Tex.
Continuation of application Ser. No. 198,914, May 31,
1962. This application Jan. 8, 1965, Ser. No. 424,318
6 Claims. (Cl. 77—73.5)

My invention relates to countersinking apparatus as related to fastener devices and more particularly to a tool for forming countersinks to receive same. This application is a continuation of my copending application, U.S. Serial No. 198,914, filed May 31, 1962, now abandoned.

Usually, it is possible to employ conventional nuts and bolts for attaching one mechanical structure to another, but in some instances it becomes necessary to employ special types of nuts and bolts. In inaccessible locations such as, for example, inside of the wing of an aircraft, it is desirable to employ a blind bolt receiving device or nut which is formed so that the nut will not turn as it is being torqued. In a copending application entitled, "Blind Press Nut Devices," U.S. Serial No. 117,322, filed June 15, 1961, I disclosed an embodiment of a bolt receiving device which will not turn when installed in the preferred manner. Such a device has a serrated collar which can be forced or seated into the structure with which it is being used. The purpose of the seated serrated collar, as disclosed in my copending application, is to prevent rotation of the nut when a bolt is threaded therein and torqued. It will be clear to those skilled in the art that such a device is particularly advantageous and is most effective in structures which are soft enough to receive the serrated collar. But, there are some structures with which the serrated type collar may not be effectively used, because the structure may be of hard material, for example, metal which has been hardened by heat treating. With such hard materials it has been necessary to rely upon other types of fasteners which have not been entirely effective and which are costly and time consuming to employ.

An object of the present invention is to provide a countersink tool for quickly and effectively forming a countersink in a structural member to mate with an improved type of fastener head configuration.

This and other objects are effected by my invention as will be apparent from the following description taken in accordance with the accompanying drawings, forming a part of this application in which.

Figure 3:
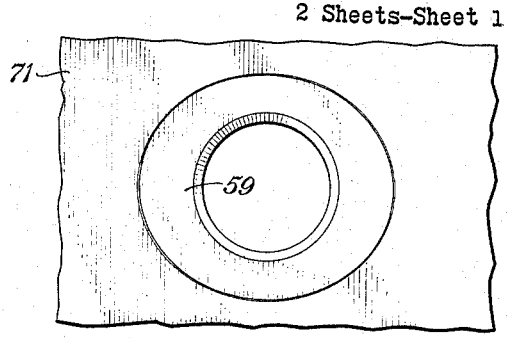
Figure 4:
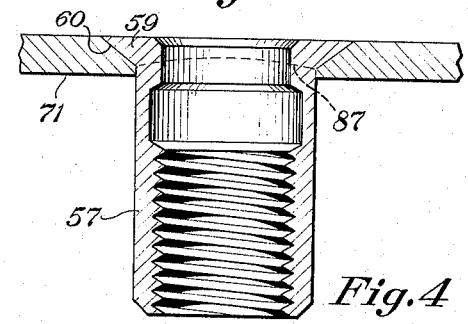
Figure 5:
Figures 6, 7:
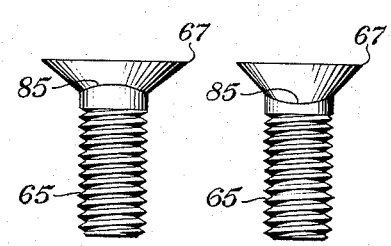

FIGS. 3 and 4 are schematic plan and longitudinal section views, respectively, of a blind press nut device having a head constructed in accordance with one embodiment of the invention; and FIGS. 5, 6, and 7 are schematic plan and elevational views, respectively, of a bolt having a head constructed in accordance with the principles of my invention. FIG. 7 is rotated 90 degrees relative to FIG. 6.

Figure 8:
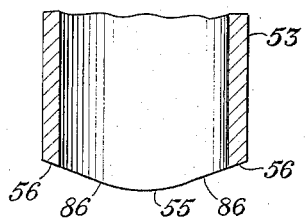
Figure 9:
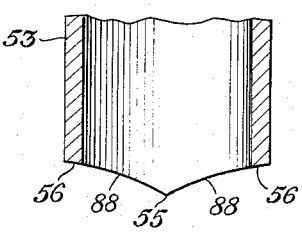

FIGS. 8 and 9 are fragmentary, longitudinal section views of a modified form of depth guide.

Figure 10:
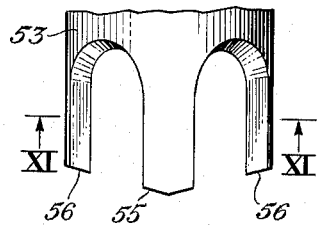
Figure 11:
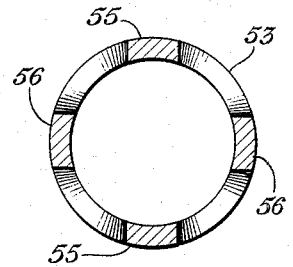

FIGS. 10 and 11 illustrate respectively a fragmentary side elevational view and a sectional view of a modified form of depth guide as seen looking along the lines XI—XI of FIG. 10.

Figure 12:
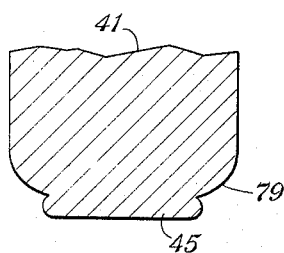
Figure 13:
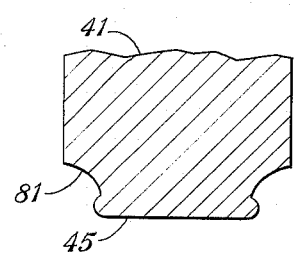

FIGS. 12 and 13 are schematic and fragmentary longitudinal sections of modified cutters.

Figure 14:
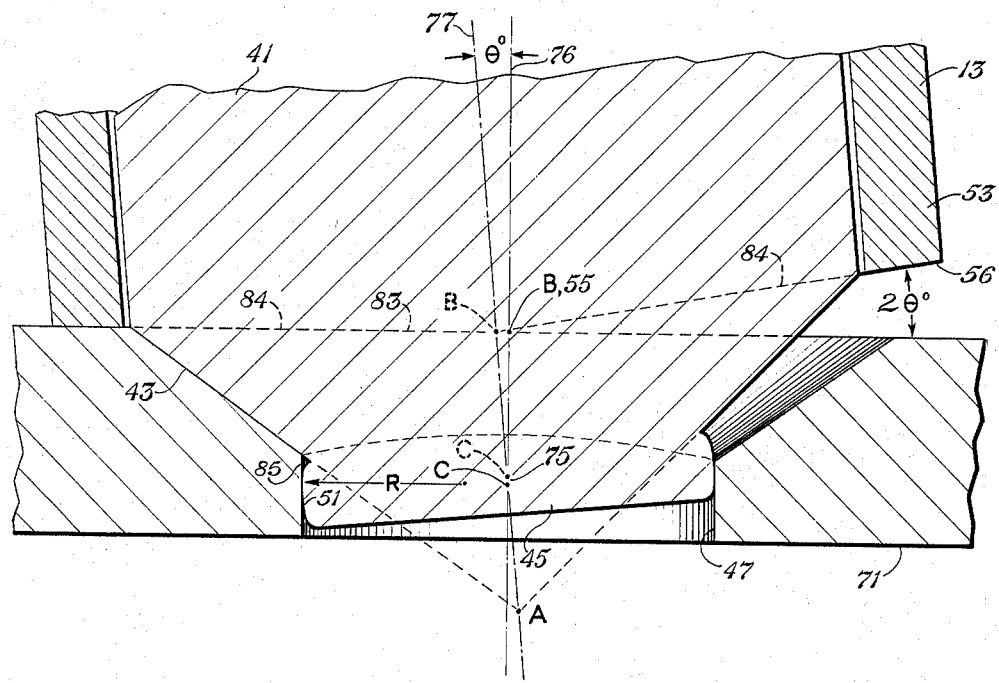

FIG. 14 is an enlarged and schematic longitudinal section view showing the movement of the cutter of the countersinking tool as it is moved to one side during the formation of a countersink.

Figure 1:
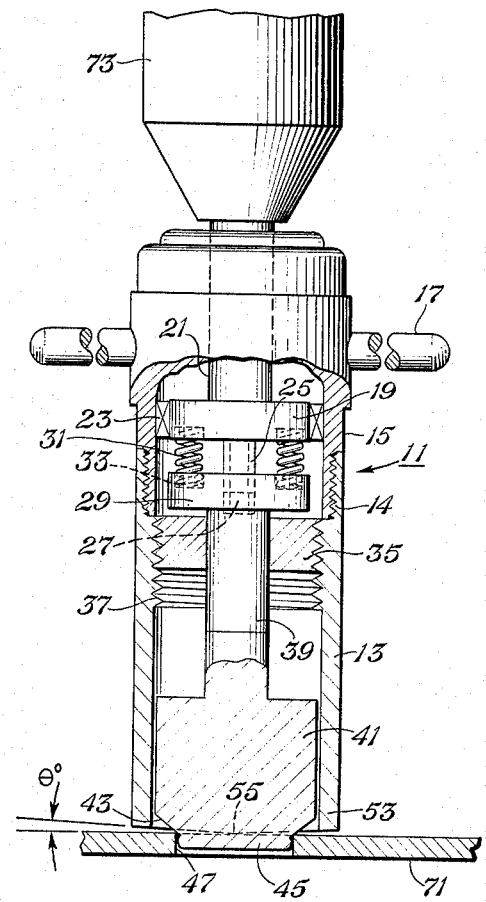
FIG. 1 is a schematic elevation view, partly in section, of a countersinking tool in accordance with a preferred embodiment of my invention.

Referring now to the drawings, FIG. 1 shows a countersinking tool 11 including a depth guide 13 which is removably attached in any suitable manner (such as by threads 14) to the lower end of a body portion 15 having a pair of diametrically opposed handles 17 extending outwardly from the body portion 15.

Internally, the body portion 15 is provided with a rotor 19 to which is integrally attached a spindle 21 that extends outwardly from the top of the body portion 15. The rotor 19 is journaled in a bearing 23 (shown schematically) mounted on the inner wall of the body 15. Extending downwardly from the rotor 19 is a spline 25 which is slidably received in a cavity 27 in a head portion 29. The purpose of the spline 25 and mating cavity 27 is to transmit torque from the rotor 19 to the head portion 29. Between the rotor 19 and the head portion 29 are a plurality of compression springs 31. Each spring is fitted into a pair of opposing sockets 33 in the rotor and the head; each socket being of diameter comparable to the diameter of the springs. Below the head portion 29 is an adjustment nut 35 engaging a threaded portion 37 of the depth guide 13. The nut 35 encircles and slidably receives a shaft 39 that is attached to the head portion 29. The lower end of the shaft 39 is adaptable to receive a countersink cutter 41 which has a plurality of cutter edges 43 of conventional form, except in the present invention the usual long cylindrical pilot shank is replaced by a short pilot shank or button 45. This button 45 is preferably integrally attached to the cutter 41 and the diameter of the button 45 is substantially the same as the diameter of a pilot hole 47 which is to be countersunk in a workpiece 71. In actual practice for pilot hole diameters up through 0.75 inch, a clearance between the button 45 and pilot hole 47 of from 0.001 to 0.007 inch has proved satisfactory. For pilot holes of larger diameters, greater clearance can be tolerated.

Figure 2:
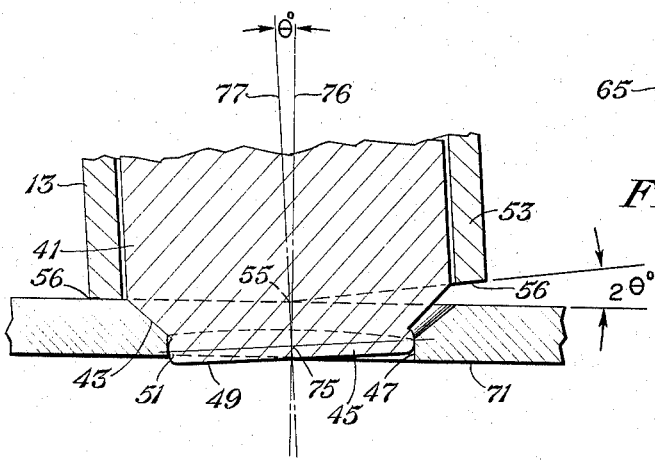
FIG. 2 is a schematic, fragmentary, longitudinal sectional view of the lower portion of the tool of FIG. 1, in one operative position.

Referring especially now to FIG. 2, it can be seen that the pilot shank or button 45 has a substantially flat bottom 49 which merges into a rounded or arcuate edge profile 51. A tangent to the upper portion of the arcuate edge 51 approaches the cutting edges 43 at an angle, preferably about 90 degrees, for a reason which will be explained hereinafter.

The depth guide 13 of FIGS. 1 and 2 differs from the conventional cylindrical depth guide in that instead of having a squarecut lower or free end, the free end 53 of the depth guide has a chisel-bevel shape that slopes upwardly from the center at an angle of $\theta$ degrees on each side of a plane perpendicular to the central axis of the tool 11. Thus, two oppositely disposed workpiece engaging portions 55 (here knife edges) are formed on the depth guide 13 at the line of intersection of two planes which make an angle of $\theta$ degrees with said perpendicular plane. Moreover, the free end has two additional workpiece engaging portions 56 spaced generally at 90 degrees from a line that passes through the first mentioned work engaging portions 55. The portions 56 are spaced axially inward (toward the tool) from the extremity of the free end of the tool, and limit the rocking or pivotal movement of the tool after the maximum axial penetration of the workpiece is reached.

Referring again to the drawings, FIGS. 3 and 4 illustrate a blind press nut 57 which is similar to the press nut described in my copending application, U.S. Serial No. 117,322, except that both the head portion 17 and the serrated collar 25 thereof are replaced by a head portion 59 with outwardly flaring asymmetrical surfaces 60. This head 59 is formed to mate with a countersink made by a countersinking tool such as that shown in FIGS. 1 and 2.

The precise geometric form of the head portion 59 will be explained hereinafter, for its form is believed not susceptible to accurate definition without considering the manner in which it is generated. Thus, the operational description that explains the manner in which the countersinks are formed or generated by countersinking tool 11 will be used to define the geometric form of the head portion 59.

FIGS. 5, 6, and 7 are plan and elevational views respectively of a bolt having a head constructed in accordance with the principles of my invention. The head 67 of the bolt 65 has the same geometry (except for the elimination of the central aperture) as the head portion 59 of the blind press nut 57 of FIGS. 3 and 4 and will be explained hereinafter in detail.

In order to describe the preferred manner of operating the countersink tool of the present invention and the manner in which the mating nuts and bolts are made and used, reference is made initially to FIGS. 1 and 2. First, a substantially straight pilot hole 47 of a selected diameter is drilled through the structure or workpiece 71. Then the countersink cutter 41, having a button 45 of proper size comparable with the hole size, is attached in any suitable manner to the shaft 39, and the spindle 21 is chucked into the usual drill motor 73. The button 45 is then inserted into the hole 47 so that the flat lower surface of the button is substantially perpendicular to the axis of the hole. Whereupon, the hole is initially countersunk in a somewhat conventional manner by rotating the spindle 21 with the drill motor 73, and by applying a downward force to the handles 17.

The depth of the countersink may be adjusted and regulated to suit the fastener head depth to maintain flushness with the structure 71 by rotating upward or downward the adjustment nut 35 in the threaded portion 37 of the depth guide 13. The depth of the countersink is determined by the relative location of the nut 35 and the head portion 29. However, adjustment of the cutter position relative to the depth guide to determine the countersink depth may be accomplished in any suitable manner, and is not limited to the specific means shown schematically in FIG. 1. Further, if desired, the depth guide could be made integral with the body portion, so long as means for countersink depth adjustment and cutter assembly and disassembly are provided.

After forming a conventional conical countersink, the workpiece engaging portions 55 will be in contact with the top surface of the structure 71. In order to form my countersink the tool 11 is rocked so that the longitudinal axis of the cutter 41 moves in a plane perpendicular to the surface of structure 71. The tool 11 is moved in this plane so that the two additional work engaging portions 53 alternately abut the top surface of the structure 71. It will be observed that the angle the tool sweeps on each side of the vertical position is $\theta$ degrees.

It will be helpful in understanding my invention to consider in further detail the action of the tool during the forming of the countersink. The rounded or arcuate edge 51 maintains a substantially tangent relation with the side wall of the pilot hole 47 through whatever angle $\theta$ the tool is moved. It will be noticed that the button 45 is constrained within the pilot hole 47, so that the tool pivot axis 75 (see FIGS. 2 and 14) remains substantially on the longitudinal axis 76 of the pilot hole 47. The tool pivot axis 75 will move up and down as the tool is moved back and forth, and the work engaging portions 55 will slide a small distance back and forth along the surface of the structure 71 in the direction of pivoting. It is important to maintain the tool pivot axis 75 in positions such that the cutter longitudinal axis is confined to movement on a fixed plane. This may be accomplished manually by utilizing the tool handles 17, or if desired a suitable auxiliary mechanical fixture may be employed, for example a bifurcated member indexed in an adjacent hole and having inner surfaces mating with surfaces on the depth gauge periphery to prevent rotation of the depth gauge about its central axis.

The movements of the tool and cutter may be best understood by referring to FIG. 14. Cutter 41 has conical cutting edges 43 that converge toward apex A, which is removed from the cutter by the termination of the cutter in button 45. It should be understood that cutting edges 43 need not be linear but may be convex as shown in FIG. 12 at 79 or concave as shown in FIG. 13 at 81. Such cutting edges will, when rotated, generate "substantially" conical surfaces and are encompassed when that term is used. The movements of the cutter of FIG. 14 are the same as the movements of modified cutters, such as those shown in FIGS. 12 and 13.

In FIG. 14 the surfaces of the countersink and also the heads 59 and 67 of the nuts and bolts of FIGS. 3 through 7 are generated by movement of a substantially conical surface in accordance with the principles of my invention. The base of the conical surface is larger than the diameter of the pilot hole 47 or shank 57, 65 so that the countersink and head will have a relatively large outwardly flaring portion. The longitudinal axis 77 of the cutter is initially coincident with the axis of the pilot hole 47 or shafts 57, 65. Then, the work engaging portions 55 (or a first selected point B) are moved a selected distance (to phantom position B) along a straight line 83 that is perpendicular to the longitudinal axis of the shank. Point B is preferably intermediate the base and apex of the cone since the base of the cone should not move to a position such that its lowest region is below the top surface of the structure 71. Point B is therefore adjacent the base of the cone but preferably not on the base.

A second selected point C is confined to movement substantially along the longitudinal axis 76 of the pilot hole 47 due to the cooperative action of button 45 and pilot hole 47. As shown in FIG. 14, point C moves upwardly to phantom position C. Point C is intermediate the first selected point B and the apex A of the conical surface, or expressed differently, point C is adjacent the apex A of the conical surface, as compared to point B, which is adjacent the base of the conical surface.

The countersink and the head portions 57 and 67 of the nuts and bolts are also generated in the manner described above. It can be appreciated that the geometry of the surfaces of the head portions of the nuts and bolts has no precise definitive term. Thus, in describing the shape of the heads of the nuts and bolts, it is necessary to talk about the manner in which their surfaces are generated as described above.

In transverse cross section the head portion of each fastener device appears elliptical, as shown in FIG. 5. It may be demonstrated, however, the head portion is not truly elliptical. The head shape of the fastener devices prevents unwanted rotation and in addition, the line of intersection 85 (see FIGS. 6 and 7) also helps prevent rotation. The intersection of head portion 67 and the cylindrical shank 65 produces a waved intersection 85 as shown. A similar intersection 87 may be seen on the press nut of FIG. 4. These intersections mate with identical intersections in the matched countersinks and thus help prevent rotation of the fastener devices.

It was mentioned hereinbefore that the rounded or arcuate edge 51 intersects the cutting edge 43 at an angle of about 90 degrees. It will be obvious to those skilled in the art that this angle may be larger or smaller within reasonable limits. This angle is not particularly critical so long as the rounded edge 51 is substantially tangent with pilot hole 47 at all angles of pivoting up to the angle $\theta$ degrees on each side of the vertical position. Preferably the radius R (see FIG. 14) of button 45 is slightly less than the radius of the pilot hole 47. This feature enables the button 45 to be substantially tangent at all times with the pilot hole 47.

The intersection of the arcuate edge 51 and the cutter surface 43 should leave a clearance pocket 85 (see FIG. 14) so that cutting edges 43 are extended radially inward sufficiently to engage workpiece 71 even after rotation of the cutter through angle $\theta$. Thus, both the upper and lower edges of arcuate edge 51 may be rounded with radii tangent to and smaller than the large radius R.

In a preferred embodiment of the invention, a value of about 8 degrees for the angle $\theta$ degrees has been found desirable for most purposes. It should be kept in mind, however, that a larger angle will produce a longer countersink which in some situations (for example, in the case of a thin workpiece) may be disadvantageous. Likewise, a smaller angle $\theta$ degrees will produce a shorter countersink which, in some situations, may be undesirable due to the inability to resist large torques. Also, it should be understood that the angle $\theta$ is directly related to the selection of the point C (see FIG. 14). The greater the distance between point B and point C, the smaller the angle $\theta$ should be.

FIGS. 8, 9, 10 and 11 illustrate modified forms of depth guide free end portions 53. Each of these depth guides (like the ones of FIGS. 1, 2 and 14) has a pair of oppositely disposed workpiece engaging portions 55 that form the extremity of the free end 53 of the depth guide. These portions 53 establish the maximum axial penetration of the cutter into workpiece 71. Moreover, there are two additional workpiece engaging portions 56 spaced axially inward from the extremity of the depth guide so that the angle $\theta$ through which the tool may be pivoted is established by the relative location of the first and second sets of workpiece engaging portions. These portions may be connected by straight lines 84 as viewed in cross section as in FIG. 14; by more or less convex lines 86 as in FIG. 8; by concave lines 88 as in FIG. 9; or they may be separated by spaces such as those shown in FIGS. 10 and 11. Hence, it may be seen that the important feature is that there be two sets of spaced work engaging portions 55 and 56.

It was mentioned hereinbefore that the button 45 has a substantially flat bottom 49. This certainly is not intended as a limitation, because the bottom 49 may have any selected shape so long as the curvature of the rounded edge 51 is substantially tangent to the wall of the hole 47 throughout pivoting. Also, in some applications it may be desirable to utilize a button in the form of a bearing that is rotatable relative to the cutter and about the cutter rotational axis.

While I have shown my invention in several forms, it will be obvious to those skilled in the art that it is not so limited, but is susceptible of various changes and modifications without departing from the spirit thereof.

I claim:

1. A countersinking tool comprising: a body wherein there is journaled a rotor to be driven by a source of rotary power; a depth guide fixed to said body and having a free end formed in a chisel-bevel by two planes intersecting in a line perpendicular to the axis of said depth guide, said planes sloping at an angle $\theta$ each side of a plane perpendicular to the longitudinal axis of said depth guide; a head portion journaled within said depth guide; resilient bias means between said head portion and said rotor for maintaining said head portion and said rotor in reciprocable spaced relation; driving means connecting said head and rotor; and a rotatable countersink cutter disposed radially inwardly of said depth guide and having a plurality of cutting edges and capped by a pilot shank having an arcuate edge profile, of such shape that a tangent to said edge profile at the intersection of said profile with said cutter edges forms an angle with a line parallel to said guide axis which is greater than said angle $\theta$.

2. A countersinking tool comprising: a body wherein there is journaled a rotor to be driven by a source of rotary power; a depth guide fixed to said body and having a free end formed in a chisel-bevel by two planes intersecting in a line perpendicular to the axis of said depth guide, said planes sloping at an angle $\theta$ each side of a plane perpendicular to the lonigtudinal axis of said depth guide; a rotatable countersink cutter disposed radially inwardly of said depth guide and having a plurality of cutting edges and capped by a pilot shank having an arcuate edge profile, of such shape that a tangent to said edge profile at the intersection of said profile with said cutter edges forms an angle with a line parallel to said guide axis which is substantially greater than said angle $\theta$, but less than 90°; and driving means connecting said cutter and rotor.

3. A countersinking tool comprising: a body wherein there is journaled a rotor to be driven by a source of rotary power; a depth guide fixed to said body and having a free end formed in a chisel-bevel by two planes intersecting in a line perpendicular to the axis of said depth guide, said planes sloping at an angle $\theta$ each side of a plane perpendicular to the longitudinal axis of said depth guide; a rotatable countersink cutter disposed radially inwardly of said depth guide and having a plurality of cutting edges and capped by a pilot shank having an arcuate edge profile of such shape that a tangent to said edge profile at the intersection of said profile with said cutter edges forms an angle with a line parallel to said guide axis which is greater than said angle $\theta$; and driving means connecting said cutter and rotor.

4. A countersinking tool comprising: a body including a depth guide having a free end formed in a chisel-bevel by two planes intersecting in a line perpendicular to the axis of said depth guide, said planes sloping at an angle $\theta$ each side of a plane perpendicular to the longitudinal axis of said depth guide; a rotatable countersink cutter disposed radially inwardly of said depth guide and having a plurality of cutting edges and capped by a pilot shank having an arcuate edge profile of such shape that a tangent to said edge profile at the intersection of said profile with said cutter edges forms an angle with a line parallel to said guide axis which is greater than said angle $\theta$; and means driving said cutter.

5. A countersinking tool comprising: a body wherein there is journaled a rotor to be driven by a source of rotary power; a depth guide fixed to said body and having a free end formed in a chisel-bevel by two intersecting planes sloping equally from each side of a plane containing the longitudinal axis of said depth guide; a rotatable countersink cutter disposed radially inwardly of said depth guide and having a plurality of cutting edges and capped by a pilot shank having an arcuate edge profile; and driving means connecting said cutter and rotor.

6. A countersinking tool comprising: a body wherein there is journaled a rotor to be driven by a source of rotary power; a depth guide fixed to said body and having a free end with two oppositely disposed workpiece engaging portions forming the extremity thereof to establish the maximum penetration of the countersinking tool into the workpiece, said free end also having two additional workpiece engaging portions spaced generally at 90° from a line passing through the first mentioned workpiece engaging portions and axially inward from the extremity of the free end of said depth guide to limit the pivotal movement of said tool after maximum penetration of the workpiece; a rotatable countersink cutter disposed radially inwardly of said depth guide and having a plurality of cutting edges and capped by a pilot shank having an arcuate edge profile; and driving means connecting said cutter and rotor.

No references cited.

WILLIAM W. DYER, JR., *Primary Examiner.*